(12) United States Patent
Jang et al.

(45) Date of Patent: *Aug. 31, 2010
(10) Patent No.: US 7,785,492 B1

(54) MASS PRODUCTION OF NANO-SCALED PLATELETS AND PRODUCTS

(75) Inventors: Bor Z. Jang, Centerville, OH (US); Aruna Zhamu, Centerville, OH (US); Jiusheng Guo, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 554 days.

This patent is subject to a terminal disclaimer.

(21) Appl. No.: 11/526,489

(22) Filed: Sep. 26, 2006

(51) Int. Cl.
*C04B 14/00* (2006.01)
*C04B 16/00* (2006.01)
*C04B 18/00* (2006.01)
*C04B 20/06* (2006.01)
*C01B 31/04* (2006.01)

(52) U.S. Cl. .................... 252/378 R; 423/448
(58) Field of Classification Search ............. 252/378 R; 423/448
See application file for complete search history.

(56) References Cited

U.S. PATENT DOCUMENTS

| 3,434,917 A | 3/1969 | Kraus et al. |
| 3,885,007 A | 5/1975 | Olsen et al. |
| 4,091,083 A | 5/1978 | Hirschvogel et al. |
| 4,244,934 A | 1/1981 | Kondo et al. |
| 4,822,590 A | 4/1989 | Morrison et al. |
| 4,895,713 A | 1/1990 | Greinke et al. |
| 5,503,717 A * | 4/1996 | Kang et al. .................. 205/478 |
| 5,698,088 A | 12/1997 | Kang |
| 6,287,694 B1 | 9/2001 | Zaleski et al. |
| 6,872,330 B2 * | 3/2005 | Mack et al. ............. 252/378 R |
| 7,071,258 B1 | 7/2006 | Jang et al. |
| 2004/0033189 A1 * | 2/2004 | Kaschak et al. ............. 423/448 |
| 2005/0271574 A1 * | 12/2005 | Jang et al. .................... 423/448 |
| 2008/0048152 A1 * | 2/2008 | Jang et al. ............... 252/378 R |

OTHER PUBLICATIONS

U.S. Appl. No. 10/858,814, filed Jun. 3, 2004, Jang, et al.
M. D. Levi and D. Aurbach, J. Phys. Chem. B, 101 (1997) 4641-4647.

* cited by examiner

*Primary Examiner*—Jessica L Ward
*Assistant Examiner*—Alexander Polyansky

(57) ABSTRACT

Disclosed is a process for exfoliating a layered material to produce nano-scaled platelets having a thickness smaller than 100 nm, typically smaller than 10 nm, and often between 0.34 nm and 1.02 nm. The process comprises: (a) charging a layered material to an intercalation chamber comprising a gaseous environment at a first temperature and a first pressure sufficient to cause gas species to penetrate into the interstitial space between layers of the layered material, forming a gas-intercalated layered material; and (b) operating a discharge valve to rapidly eject the gas-intercalated layered material through a nozzle into an exfoliation zone at a second pressure and a second temperature, allowing gas species residing in the interstitial space to exfoliate the layered material to produce the platelets. The gaseous environment preferably contains only environmentally benign gases that are reactive (e.g., oxygen) or non-reactive (e.g., noble gases) with the layered material. The process can additionally include dispersing the platelets in a matrix material to form a nanocomposite. The process also can include an additional process of re-compressing the nana-scaled platelets into a product such as a flexible graphite sheet.

20 Claims, 3 Drawing Sheets fully separated nano platelets

MASS PRODUCTION OF NANO-SCALED PLATELETS AND PRODUCTS

This invention is based on the research result of a DoE SBIR project. The US government has certain rights on this invention.

FIELD OF THE INVENTION

The present invention relates generally to a process for mass-producing nano-scaled plate-like or sheet-like structures, such as nano-scaled graphene platelets (NGPs) and clay nano-platelets, and products derived from these platelets.

BACKGROUND

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and composite reinforcements.

However, CNTs are extremely expensive due to the low yield and low production and purification rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called "nano-scaled graphene plates (NGPs)." NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications.

Direct synthesis of the NGP material had not been possible, although the material had been conceptually conceived and theoretically predicted to be capable of exhibiting many novel and useful properties. Jang and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. Another process developed by B. Z. Jang, et al. ["Process for Producing Nano-scaled Graphene Plates," U.S. patent pending, Ser. No. 10/858,814 (Jun. 3, 2004), now abandoned] involves (1) providing a graphite powder containing fine graphite particles (particulates, short fiber segments, carbon whisker, graphitic nano-fibers, or combinations thereof) preferably with at least one dimension smaller than 200 µm (most preferably smaller than 1 µm); (2) exfoliating the graphite crystallites in these particles in such a manner that at least two graphene planes are either partially or fully separated from each other, and (3) mechanical attrition (e.g., ball milling) of the exfoliated particles to become nano-scaled to obtain NGPs. The starting powder type and size, exfoliation conditions (e.g., intercalation chemical type and concentration, temperature cycles, and the mechanical attrition conditions (e.g., ball milling time and intensity) can be varied to generate, by design, various NGP materials with a wide range of graphene plate thickness, width and length values. Ball milling is known to be an effective process for mass-producing ultra-fine powder particles. The processing ease and the wide property ranges that can be achieved with NGP materials make them promising candidates for many important industrial applications. The electronic, thermal and mechanical properties of NGP materials are expected to be comparable to those of carbon nano-tubes; but NGP will be available at much lower costs and in larger quantities.

In this and other methods for making separated graphene or other non-carbon inorganic platelets, the process begins with intercalating lamellar flake particles with an expandable intercalation compound (intercalant), followed by expanding the intercalant to exfoliate the flake particles. Conventional intercalation methods and recent attempts to produce exfoliated products or separated platelets are given in the following representative references:

1. J. W. Kraus, et al., "Preparation of Vermiculite Paper," U.S. Pat. No. 3,434,917 (Mar. 25, 1969.
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).
10. Morrison, et al., "Forms of Transition Metal Dichalcogenides," U.S. Pat. No. 4,822,590 (Apr. 18, 1989).

One common feature of these methods is the utilization of liquid or solution-based chemicals to intercalate graphite or other inorganic flake particles. These chemicals often comprise strong acids (e.g., sulfuric or nitric acids), solvents, or other undesirable species that can reside in the material. For instance, Mack, et al. [Ref 9] intercalated laminar materials with alkali metals (e.g. Li, Na, K, Rb, Cs), alkaline earth metals (e.g. Mg, Ca, Sr, Ba), Eu, Yb, or Ti. Intercalation of these elements was accomplished by five different routes: (1) intercalated electrochemically using a non-aqueous solvent; (2) using an alkali plus naphthalene or benzophenone along with a non-aqueous solvent (usually an ether such as tetrahydrofuran); (3) using amalgams (metal+mercury); (4) dissolving any of the afore-mentioned metals in a liquid ammonia solution to create solvated ions; and (5) using n-butyl lithium in a hydrocarbon solvent (e.g., hexane).

In addition to the utilization of undesirable chemicals, in most of these methods of graphite intercalation and exfoliation, a tedious washing step is required, which produces contaminated waste water that requires costly disposal steps. Furthermore, conventional exfoliation methods normally involve a very high furnace temperature (typically between 500° C. and 2,500° C.) since the process depends on vaporization or decomposition of a liquid or solid intercalant. Intercalation with an alkali or alkaline earth metal normally entails immersing the layered material in a metal compound solution (rather than pure metal), allowing the metal ions to penetrate into the inter-layer galleries (interstitial spaces). Typically, metal ion content is relatively low compared to other elements in such a compound solution (e.g., in a solution of 20% by weight lithium chloride in water, lithium content is only 3.27% by weight). Hence, only a small amount of ions from a relatively dilute solution penetrates and stays sporadically in these spaces. The resulting exfoliated product often exhibits platelets of widely varying thicknesses and many incompletely delaminated layers.

In a co-pending application [Bor Z. Jang, Aruna Zhamu, and Jiusheng Guo, "Process for Producing Nano-scaled Platelets and Nanocomposites," U.S. patent pending, Ser. No. 11/509,424 (Aug. 25, 2006), now abandoned], we provided an environmentally benign process for exfoliating a laminar or layered compound or element, such as graphite, graphite oxide, and transition metal dichalcogenides, without using undesirable intercalating chemicals. This was a relatively low-temperature process and it produced nano-scaled platelets with relatively uniform thicknesses. This process comprises: (a) subjecting a layered material to a gaseous environment at a first temperature and first pressure sufficient to cause gas species to penetrate into the interstitial space between layers of the layered material, forming a gas-intercalated layered material; and (b) subjecting the gas-intercalated layered material to a second pressure, or a second pressure and a second temperature, allowing gas species to greatly pressurize the interstitial space and thereby exfoliating the layered material to produce partially delaminated or totally separated platelets. In a preferred mode, step (a) of subjecting a layered material to a gaseous environment comprises placing the material in a sealed vessel containing a pressurized gas and step (b) comprises opening the vessel to partially or totally release the gas. Upon pressure release, the material is placed in a pre-heated furnace at a second temperature (which is typically higher than the first temperature) to help soften the intercalated material and instantaneously increase the internal pressure of the interstitial space. This earlier application did not address the issue of mass production. In the present application, we describe, in detail, a specific process that is capable of producing nano-scaled platelets on a semi-continuous basis. This specific process typically involves a higher first temperature and a lower second temperature with a much higher first pressure and a lower second pressure.

SUMMARY OF THE INVENTION

In summary, the present invention provides a process for exfoliating a layered (laminar) material to produce nano-scaled platelets having a thickness smaller than 100 nm. The process comprises: (a) charging a layered material to an intercalation chamber comprising a gaseous environment at a first temperature (typically 50° C. to 200° C., but could be higher) and a first pressure (typically 2 atm to 10 atm) sufficient to cause gas species to penetrate into the interstitial space between layers of the layered material, forming a gas-intercalated layered material; and (b) operating a discharge valve to rapidly eject the gas-intercalated layered material through a nozzle into an exfoliation zone at a second pressure and a second temperature, allowing gas species residing in the interstitial space to exfoliate the layered material to produce the platelets. The gaseous environment preferably contains only environmentally benign gases that are reactive (e.g., oxygen) or non-reactive (e.g., noble gases) with the layered material. Step (a) may be preceded by a step of pre-pressurizing or pre-intercalating the layered material in a separate chamber to reduce the necessary intercalation time in step (a).

The starting layered material preferably comprises small particles with a dimension smaller than 10 μm and more preferably smaller than 1 μm. The gas preferably is selected from hydrogen, helium, neon, argon, nitrogen, oxygen, fluorine, carbon dioxide, or a combination thereof. The process may include an additional step of applying air milling, ball milling, mechanical attrition, and/or sonification to further separate the platelets and/or reduce a size of the platelets. The resulting platelets typically have a thickness smaller than 10 nm and many have a thickness smaller than 1 nm. For graphite flakes, the resulting graphene platelets typically contain one to five layers of graphite planes or graphene sheets with each layer of approximately 0.34 nm (3.4 Å) thick. For graphite oxide flakes, each layer or sheet is approximately 0.64 nm to 1.02 nm in thickness (depending upon the degree of oxidation), but more typically close to 0.74 nm.

The layered material could be graphite, graphite oxide, graphite fluoride, pre-intercalated graphite, pre-intercalated graphite oxide, graphite or carbon fiber, graphite nano-fiber, or a combination thereof. It could comprise a layered inorganic compound selected from a) clay; b) bismuth selenides or tellurides; c) transition metal dichalcogenides; d) sulfides, selenides, or tellurides of niobium, molybdenum, hafnium, tantalum, tungsten or rhenium; e) layered transition metal oxides; f) graphite or graphite derivatives; g) pre-intercalated compounds, or a combination thereof. In the case of graphite flakes, this layered material can react with oxygen in the gaseous environment at an elevated temperature (e.g., higher than 100° C.) to form partially oxidized graphite or graphite oxide.

Certain nano-scaled platelets (e.g., graphite oxides) are hydrophilic in nature and, therefore, can be readily dispersed in selected solvents (e.g., water). Hence, the invented process can include an additional step of dispersing the platelets in a liquid to form a suspension or in a monomer- or polymer-containing solvent to form a nanocomposite precursor suspension. This suspension can be converted to a mat or paper (e.g., by following a paper-making process). The nanocomposite precursor suspension may be converted to a nanocomposite solid by removing the solvent or polymerizing the monomer. Alternatively, the platelets may be mixed with a monomer or polymer to form a mixture, which can be converted to obtain a nanocomposite solid. In the case of graphite oxide platelets, the process may further include a step of partially or totally reducing the graphite oxide (after the formation of the suspension) to become graphite (serving to recover at least partially the high conductivity that a pristine graphite would have).

DETAILED DESCRIPTION OF PREFERRED EMBODIMENTS

One preferred embodiment of the present invention is a process for mass-producing a nano-scaled graphene plate (NGP) material that is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. The thickness of an NGP is 100 nanometers (nm) or smaller. The length and width of a NGP could exceed 1 μm. Preferably, however, both length and width are smaller than 1 μm. Graphite is but one of the many examples of laminar or layered materials that can be exfoliated to become nano-scaled platelets. A layered inorganic compound may be selected from (a) clay; (b) bismuth selenides or tellurides; (c) transition metal dichalcogenides; (d) sulfides, selenides, or tellurides of niobium, molybdenum, hafnium, tantalum, tungsten or rhenium; (e) layered transition metal oxides; (f) graphite or graphite derivatives; (g) pre-intercalated compounds, or a combination thereof. For instance, both un-intercalated and intercalated graphites are commercially available, which can be exfoliated with the presently invented pressure reduction and material ejection process. The presently invented process works for all of these classes of laminar materials.

Generally speaking, a process has been developed for exfoliating a layered or laminar material to produce nano-scaled platelets having a thickness smaller than 100 nm. The process comprises: (a) charging a layered material in a fine powder form to a gaseous environment at a first temperature and first pressure sufficient to cause gas species to penetrate into the interstitial space between layers of the layered material, forming a gas-intercalated layered material; and (b) operating a discharge valve to rapidly eject the gas-intercalated layered material through a nozzle into an exfoliation zone at a second pressure and a second temperature, allowing gas species residing in the interstitial space to exfoliate the layered material to produce the platelets.

Figure 1:
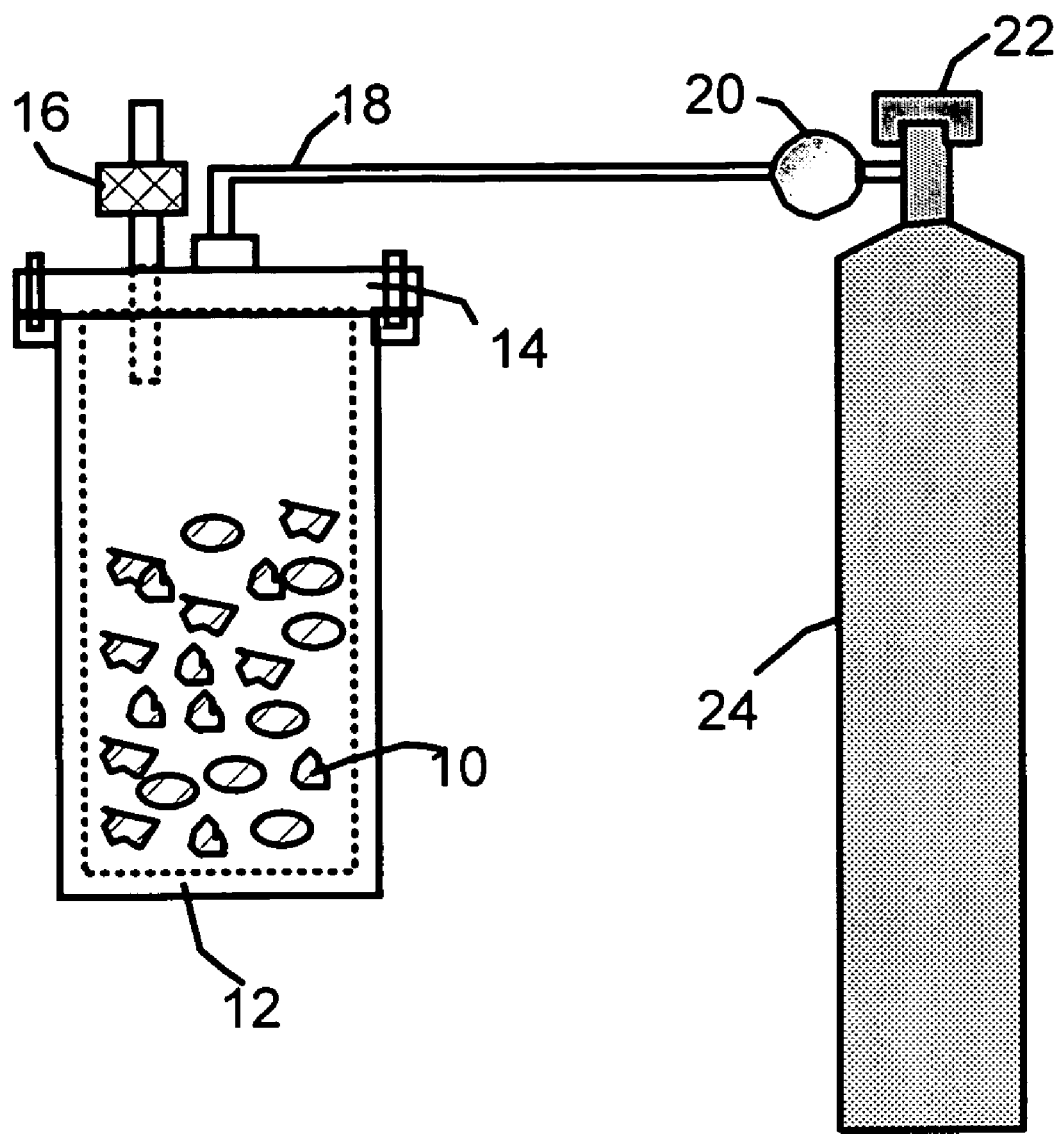
FIG. 1 Schematic of an apparatus that can be used to produce nano-scaled platelets such as nano-scaled graphene plates (NGPs).

To illustrate the preferred embodiments of the presently invented process, we begin by describing a preferred embodiment of our co-pending application [U.S. patent application Ser. No. 11/509,424 (Aug. 25, 2006), now abandoned]. As indicated in FIG. 1 (which is identical to FIG. 1 of the co-pending application), a platelet-producing process begins with step (a) of subjecting a layered material to a gaseous environment. This step comprises placing the layered material 10 in a sealed vessel 12 containing a pressurized gas typically at a pressure greater than 1 atm and at a first temperature, typically room temperature or slightly higher. The vessel can be internally or externally heated to provide a controlled first temperature. The process also includes step (b) which comprises releasing the excess gas from the vessel to suddenly reduce the vessel pressure and removing the gas-intercalated material from the vessel, preferably into a furnace or oven at a pre-set temperature, which is typically much higher than the first temperature.

The pressurizing or intercalating gas may be supplied from a gas cylinder 24 through a tubing 18, with the gas pressure controlled by a gas regulator 22 and a pressure gauge 20. The gas species can penetrate into the interstitial space between layers of the laminar material and stay therein under a pressure. The amount (solubility) of gas species that can reside in the interstitial space at a given temperature increases with the increasing pressure. After a duration of gas intercalation time, typically from minutes to hours, the excess pressurized gas is released (e.g., through a gas release valve 16) and the gas-intercalated layered material is removed from the vessel (e.g., by removing the cover 14 first). The gas-intercalated material is now at a second pressure (e.g., 1 atm in room air), which is lower than the first pressure of typically greater than 1 atm (typically up to 10 atm, but could be higher). The material is quickly transferred to a furnace pre-set at a second temperature of typically in the range of 50° C. to 1,500° C., but more typically between 100° C. to 500° C., allowing the gas species to exfoliate the layered material by way of pressurizing, expanding, and escaping.

It is of great interest to note that prior art exfoliation processes normally involve intercalating laminar materials with liquid or solid intercalants, which are heated to pressurize the interstitial space through vaporization as a result of chemical decomposition or phase transition. Heating to a relatively high temperature is absolutely required in these prior art processes to achieve exfoliation. In contrast, as indicated in our co-pending application, it was surprising to observe that by simply reducing the surrounding pressure of the laminar material (containing super-saturated gas species residing in the interlayer spaces) in an abrupt or quick manner one could readily exfoliate layered materials. Additional heat was not required. However, optionally and preferably, this pressure reduction step was immediately followed by a step to rapidly expose the gas-intercalated material to a higher temperature. This higher temperature presumably produced a high pressure in the interstitial space, leading to a larger expansion ratio (final exfoliated sample thickness/original sample thickness).

This co-pending application [U.S. patent application Ser. No. 11/509,424 (Aug. 25, 2006), now abandoned] did not address the issue of mass production. Hence, we presented herein a semi-continuous process that is capable of mass-manufacturing exfoliated platelets at a relatively high production rate. The presently invented process enables the availability of nano-scaled platelets in large quantities and can significantly reduce the product cost. Low production rates and high product costs have been the main obstacles to successful commercialization of nano materials in general and nano carbon materials (e.g., CNTs) in particular. The presently invented process makes use of environmentally benign gases as intercalating agents, resulting in nano-scaled platelets containing no chemical residue.

One of the preferred embodiments of the present invention is a process that involves intercalating and ejecting the layered material at a relatively high temperature (but still typically lower than 200° C.) and relatively high pressure (typically 2-10 atm, but could be much higher). This process generally results in fully separated, isolated platelets. However, with a relatively low intercalation pressure (e.g., lower than 2 atm), the exfoliated product may contain incompletely separated platelets. Hence, the process may further include a step of air milling, ball milling, mechanical attrition, and/or sonification to further separate the platelets and/or reduce the size of the platelets.

Figure 2:
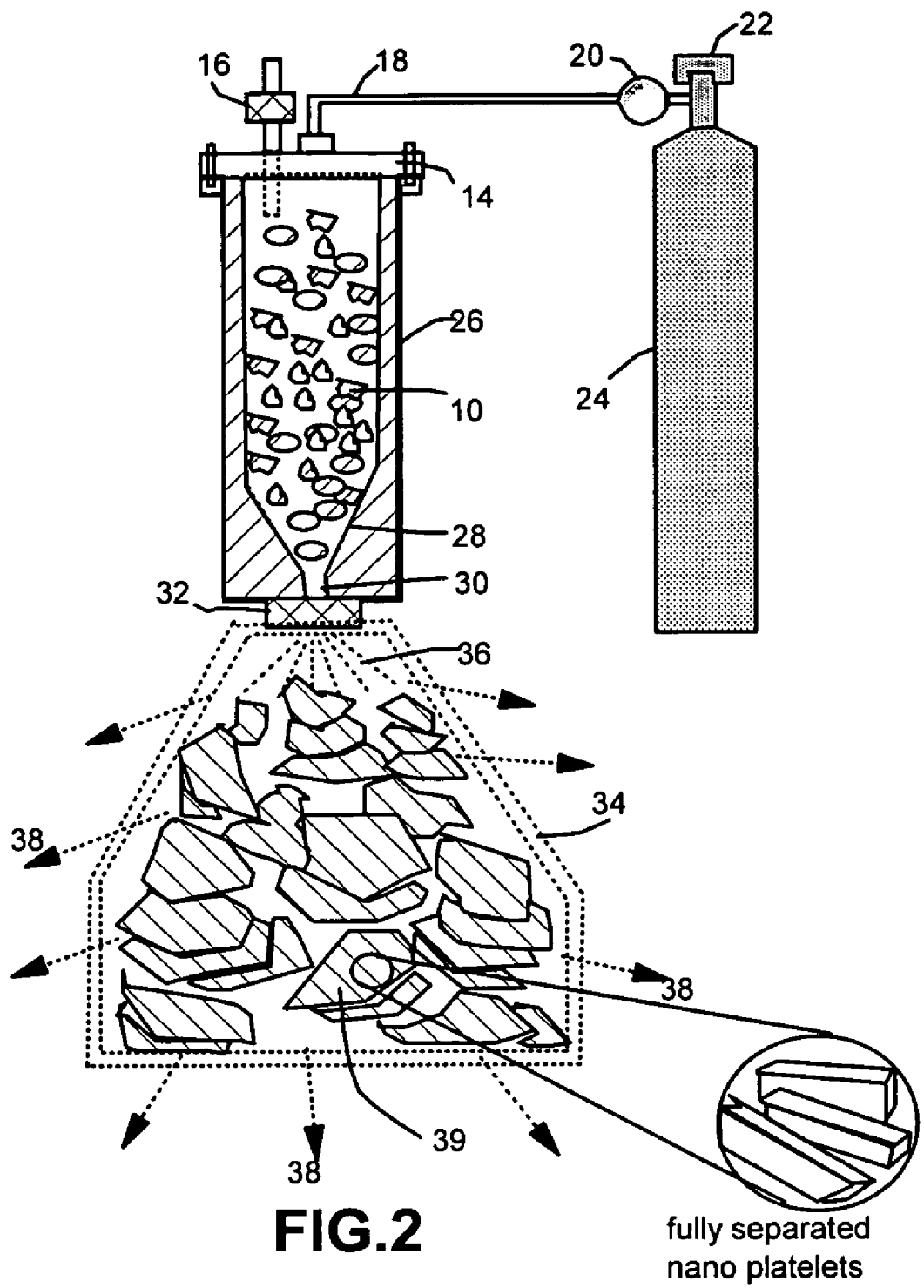
FIG. 2 Schematic of a nano platelet-producing apparatus that can be used to produce platelets according to a preferred embodiment of the presently invented process.

Referring to FIG. 2, a layered material (e.g., fine graphite powder 10) is charged into a chamber 26, which is pressurized by gas molecules introduced from a gas cylinder 24 through a tubing 18, with the gas pressure controlled by a gas regulator 22 and a pressure gauge 20. A pressurized gas may come from an air compressor or other sources (e.g., vaporization of water). A cover 14 may be opened and closed for receiving the layered material particles. The chamber temperature and pressure are such that a sufficient amount of gas species enters the interstitial space between layers. The maximum amount or solubility of interstitial gas species in a layered material is proportional to both the temperature and pressure, with pressure being a more important factor than temperature in determining the solubility. However, temperature appears to be the dominating factor in determining the intercalation time.

The chamber 26 preferably has a tapered region 28 where the diameter is decreased to a much smaller diameter at a nozzle 30. Such a configuration allows the pressurized gas in the chamber to rapidly propel the gas-intercalated layered material from the intercalation chamber 26 into an exfoliation zone 34 once a valve 32 of the nozzle 30 is opened. The gas flow 36 carries the intercalated layered material powder into the exfoliation zone where the material experiences a sudden reduction in pressure that puts the intercalated material in a supersaturated state. The material undergoes an instantaneous exfoliation to become separated nano-scaled platelets 39. The exfoliation zone may be a chamber that has many holes to allow exhaust gas 38 to escape.

Using graphite as an example, the first step may involve preparing a laminar material powder containing fine graphite particulates (granules) or flakes, short segments of carbon fiber (including graphite fiber), carbon or graphite whiskers, graphite nano-fibers, or their mixtures. The length and/or diameter of these graphite particles are preferably less than 0.2 mm (200 μm), further preferably less than 0.01 mm (10 μm), and most preferably smaller than 1 μm. The graphite particles are known to typically contain micron- and/or nanometer-scaled graphite crystallites with each crystallite being composed of one sheet or several sheets of graphite plane. Preferably, large graphite particles are pulverized, chopped, or milled to become small particles or short fiber segments before being charged into the intercalation chamber 26. The reduced particle sizes facilitate fast diffusion or migration of an intercalating gas into the interstices between graphite planes in graphite crystallites. Other layered compounds have similar inter-layer galleys to accommodate intercalant gases.

The advantage of having small-sized starting materials may be further illustrated as follows: The diffusion coefficient D of an intercalant between two graphite planes is known to be typically in the range of $10^{-12}$ to $5 \times 10^{-9}$ cm$^2$/sec at room temperature [e.g., M. D. Levi and D. Aurbach, J. Phys. Chem. B, 101 (1997) 4641-4647]. The required diffusion time $\tau$ to achieve a desired diffusion path $\lambda$ is known to be given approximately by $\tau = \lambda^2/D$. Assume that $D=10^{-10}$ cm$^2$/sec and $\lambda=100$ μm (graphite particle size=100 μm), then the required diffusion time at room temperature will be $\tau=(100\times10^{-4}$ cm$)^2/(10^{-10}$ cm$^2$/sec$)=10^6$ sec (277 hours or 11.5 days). This implies a very lengthy gas intercalation time if the particle size is too large (say, greater than 100 μm). This issue may be addressed by using two approaches: by increasing the chamber temperature and/or decreasing the particle sizes. Specifically, the diffusion time can be reduced if the diffusion temperature T is raised substantially to increase the diffusion coefficient since $D=D_o \exp(-Q/RT)$, where Q is the activation energy for the diffusion process and R is the universal gas constant. Further, if the particle size is $\lambda=1$ μm (rather than 100 μm), then we have $\tau=(1\times10^{-4}$ cm$)^2/(10^{-10}$ cm$^2$/sec$)=100$ sec at room temperature. This is a very reasonable diffusion time, which can be further reduced by increasing the intercalation chamber temperature. In the worst case scenario, where $D=10^{-12}$ cm$^2$/sec (instead of $10^{-10}$ cm$^2$/sec), the required intercalation time will be 10,000 sec=2.78 hours for graphite particles with a lateral dimension of 1 μm. Again, this processing time of less than 3 hours can be further reduced by increasing the pressure vessel temperature for interaction. For all of the layered materials that we have studied so far, pure graphite and graphite fibers have the lowest diffusion coefficients, likely due to the smallest interlayer spacing (only 0.34 nm). Other materials, such as clay; bismuth selenides or tellurides; transition metal dichalcogenides; sulfides, selenides, or tellurides of niobium, molybdenum, hafnium, tantalum, tungsten or rhenium; layered transition metal oxides; and graphite oxides, typically have an interlayer spacing between 0.6 and 1.5 nanometers. Hence, the diffusion coefficients of a gas species in these laminar materials are much higher and the required intercalation times are shorter. Furthermore, these larger interstitial spaces can more readily accommodate larger gas molecules.

The second step involves a phenomenon similar to the discharge of gases from an internal combustion engine chamber. The high pressure generated by the compressed gas and a high temperature (typically in the range of 50° C.-200° C.) serves to discharge the gas-intercalated laminar material out of the intercalation chamber into an exfoliation zone, which is at a much lower pressure (normally 1 atm). At such a reduced pressure, the gas solubility in a laminar material (e.g., graphite flakes) is much lower and the material is at a super-saturation state. Hence, the excess gas species would want to expand or escape. The escaping gas species appear to be capable of overcoming weak van der Waal's forces between layers, thereby delaminating or fully separating graphene planes in a graphite crystallite. This observation could also be theorized as follows: When the laminar material is subjected to a high gas pressure, gas molecules penetrate into the interstitial spaces to the extent that the internal pressure (inside the interstitial spaces) is balanced by the chamber pressure of the sealed vessel. When the gas pressure surrounding the material is suddenly reduced, the gas molecules inside the interstitial spaces find themselves under a high pressure and wanting to expand. This pressure is sufficient to overcome the relatively weak van der Waal's forces between layers, producing separated layers.

Figure 3:
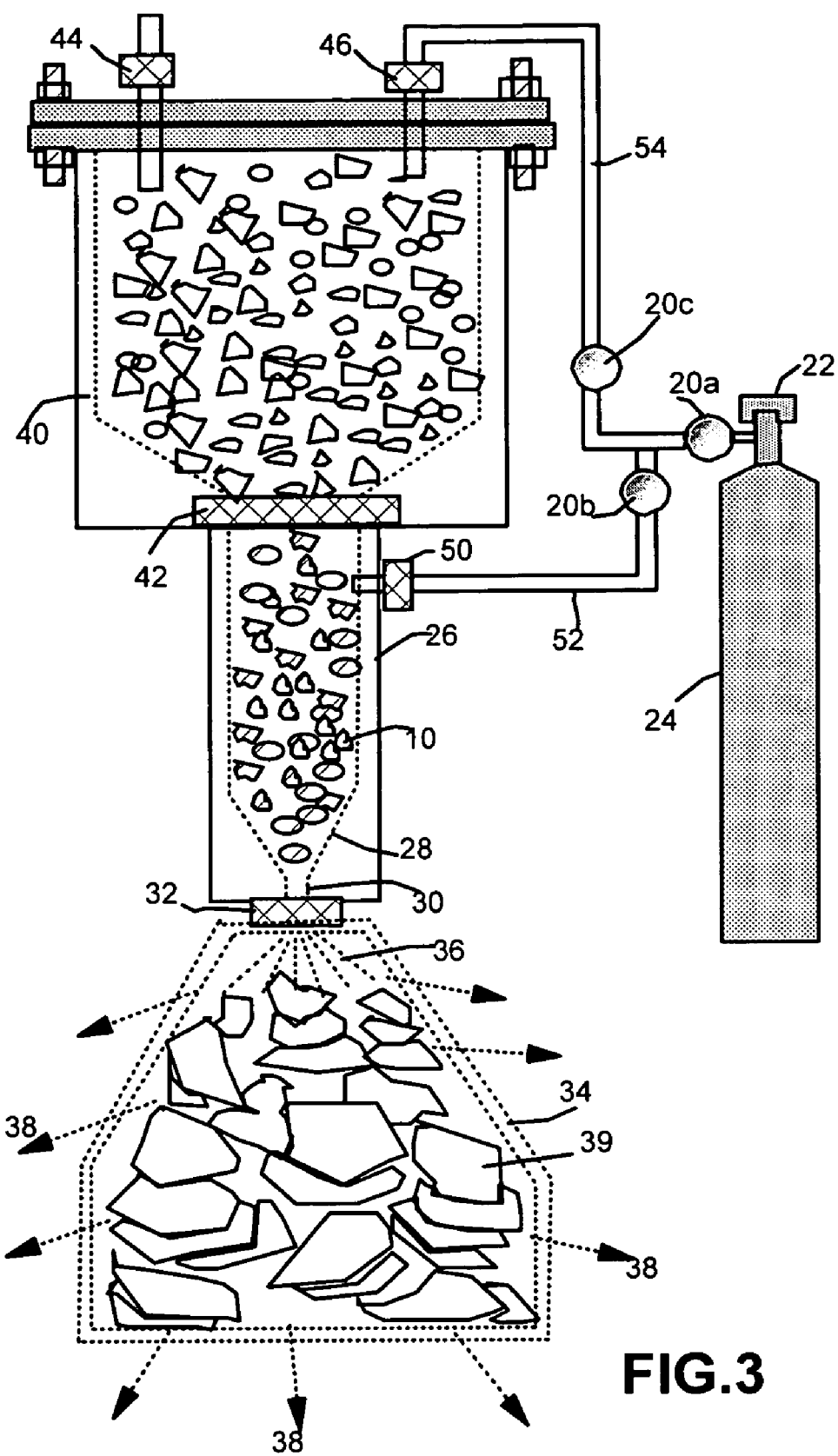
FIG. 3 Schematic of another apparatus for mass production of nano platelets.

Another preferred embodiment of the present invention is a process that entails the aforementioned step (a) and step (b), plus a step that precedes step (a). This additional step comprises pre-pressurizing the starting layered material in a separate chamber hereinafter referred to as a pre-pressurization chamber (40 in FIG. 3). This chamber 40 is normally isolated from the intercalation chamber 26 via a control valve 42. This valve is normally closed until when it is ready to re-charge a desired amount of layered material into the intercalation chamber 26 from the pre-pressurization chamber 40. The two chambers may be separately pressurized with a gas through valves 50, 46, tubings 52, 54, and regulators/gauges 20b, 20c, respectively. The gas in the two chambers can be the same or different gas. The pressure in the two chambers can be the same or different, but typically the pressure in the pre-pressurization chamber is lower than that in the intercalation chamber. The pre-pressurization chamber is preferably equipped with a release valve 44 for safety. The two chambers are shown to come from the same compressed gas source 24 regulated by a valve 22 and pressure gauge 20a; but they do not have to come from the same source. This pre-pressurization step serves to pre-intercalate the layered material to a desired extent for the purpose of reducing the intercalation time of the laminar material in the intercalation chamber 26. The pre-pressurization chamber (really a pre-intercalation chamber) may be slightly heated to accelerate the intercalation process. Each time after the intercalation chamber 26 is emptied, a desired amount of pre-intercalated layered material may be charged into chamber 26 from chamber 40. This amount of material is almost ready for discharge, except for perhaps some additional heating if a higher temperature is so desired. Such an arrangement can significantly curtail the required interaction time in the intercalation chamber 26 and significantly reduce the total production cycle time. Such a semi-continuous process makes it possible to mass-produce nano-scaled platelets in large quantities at a high through-put rate.

An optional third step includes subjecting the exfoliated material to a mechanical attrition treatment to further reduce the particle sizes (or fully separate those un-separated platelets) for producing the desired nano-scaled platelets. With this treatment, either the individual graphene planes (one-layer NGPs) or stacks of graphene planes bonded together (multi-layer NGPs) are reduced to become nanometer-sized in width and/or length. In addition to the thickness dimension being nano-scaled, both the length and width of these NGPs could be reduced to smaller than 100 nm in size if so desired. In the thickness direction (or c-axis direction normal to the graphene plane), there may be a small number of graphene planes that are still bonded together through the van der Waal's forces that commonly hold the basal planes together in a natural graphite (when the intercalation pressure was relatively low, e.g., lower than 2 atm). In these cases, typically, there are less than 20 layers (often less than 5 layers) of graphene planes, each with length and width smaller than 100 nm, that constitute a multi-layer NGP material produced after mechanical attrition.

Attrition can be achieved by pulverization, grinding, ultra-sonication, milling, etc., but the most effective method of attrition is ball-milling. High-energy planetary ball mills were found to be particularly effective in producing nano-scaled graphene plates. Since ball milling is considered to be a mass production process, the presently invented process is capable of producing large quantities of NGP materials cost-effectively. This is in sharp contrast to the production and purification processes of carbon nano-tubes, which are slow and expensive.

The ball milling procedure, when down-sizing the particles, tend to produce free radicals at peripheral edges of graphene planes. These free radicals are inclined to rapidly react with non-carbon elements in the environment. These non-carbon atoms may be selected to produce desirable chemical and electronic properties. Of particular interest is the capability of changing the dispersibility of the resulting nano-scaled platelets in a liquid or matrix material for the purpose of producing nanocomposites. Non-carbon atoms typically include hydrogen, oxygen, nitrogen, sulfur, and combinations thereof.

Another embodiment of the present invention is a process as described above, but the pressurizing gas is produced by placing a controlled amount of a volatile but benign liquid (liquid with a low vaporization temperature such as water, ethanol, and methanol) inside the vessel and implementing a heating element in the vessel to heat and vaporize the liquid. The resulting water and/or alcohol vapor is capable of intercalating interlayer galleries of a range of laminar materials such as graphite oxide and transition metal dichalcogenides. The vessel may be opened while the intercalant is still in the vaporous state to discharge and exfoliate the intercalated material.

In yet another preferred embodiment of the present invention, the gas environment may comprise a supercritical fluid (SCF). A SCF can be defined as a material that is maintained at a temperature that exceeds a critical temperature and at a pressure that exceeds a critical pressure so as to place the material in a supercritical state. In such a state, the SCF has properties that cause it to act, in effect, as both a gas and a liquid. Thus, in the supercritical state, such a fluid has the solvent characteristics of a liquid, but the surface tension thereof is substantially less than that of a liquid so that the fluid can diffuse much more readily into a solute material (i.e., a layered material in the present context). For example, carbon dioxide ($CO_2$) can be transformed into a supercritical state when its temperature exceeds 31° C. and its pressure exceeds 74.83 atm (1,100 psi). The thermodynamic and physical properties of a SCF vary with pressure. Some representative characteristics include diffusivity, density, dynamic viscosity, cohesive energy density, heat capacity, and thermal conductivity. The diffusivity and dynamic viscosity of a SCF may be adjusted to maximize the intercalation rate of the fluid into the interstitial space of a layered material.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene plates (sheets of graphene planes or basal planes) that are bonded together through van der Waals forces in the c-direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, or carbon/graphite whisker or nano-fiber. In the case of a carbon or graphite fiber segment, the graphene plates may be a part of a characteristic "turbostratic structure."

When a graphite flake sample is sealed in a vessel containing oxygen at an elevated temperature (200-500° C.), chemical reactions between oxygen and graphite could occur, resulting in the formation of a partially oxidized graphite or graphite oxide. By releasing the pressurizing oxygen gas, one obtains well-exfoliated graphite oxide platelets. This example illustrates the potential of permitting a pressurizing gas to take part in a benign chemical reaction to produce an exfoliated product that is chemically different from the starting laminar material.

In prior art processes, for the purpose of exfoliating graphene plane layers, the chemical treatment of the graphite powder involves subjecting particles of a wide range of sizes to a chemical solution for periods of time ranging from about one minute to about 48 hours. The chemical solution was selected from a variety of oxidizing solutions maintained at temperatures ranging from about room temperature to about 125° C. Commonly used intercalation compounds are $H_2SO_4$, $HNO_3$, $KM_nO_4$, and $F_eCl_3$, ranging from about 0.1 normal to concentrated strengths. These strong acids are undesirable and, hence, the resulting exfoliated material has to be thoroughly washed, which is an expensive and lengthy process. In contrast, the presently invented process involves the utilization of environmentally benign intercalation gases such as hydrogen, inert gases, or oxygen. No potentially hazardous chemical is required and no intercalation compound remains in the resulting platelets as a chemical residue.

Morrison, et al. [U.S. Pat. No. 4,822,590, Apr. 18, 1989] have disclosed a method of preparing single-layer materials of the form $MX_2$, where $MX_2$ is a transition metal layer-type dichalcogenide such as $MoS_2$, $TaS_2$, $WS_2$, and the like. The process involved intercalating the $MX_2$ with an alkali metal (e.g., lithium or sodium) in a strictly dry environment for a sufficient length of time to enable the lithium or sodium to substantially intercalate the $MX_2$. The lithium- or sodium-intercalated $MX_2$ is then immersed in water. The water reacts with the intercalated lithium or sodium and forms hydrogen gas between the layers of $MX_2$. The pressure of the evolved hydrogen gas causes the layers of $MX_2$ to exfoliate into single layers. This single layer $MX_2$ material may be useful as a coating and a lubricant. However, pure lithium and sodium must be handled with extreme care in an absolutely dry environment. With a melting point of 180.7° C., lithium will have to be intercalated into $MX_2$ at a high temperature in a completely water-free environment, which is not very conducive to mass production of exfoliated products. In contrast, the presently invented process does not involve a highly explosive chemical or a violent chemical reaction such as $2Li + 2H_2O \rightarrow H_2 + 2Li^+ + 2OH^-$.

Once the nano platelets are produced, the platelets may be subjected to further treatments to prepare useful products. For instance, the platelets (e.g., graphene platelets) may be re-compressed into a sheet-like structure commonly referred to as flexible graphite. Additionally, the platelets may be dispersed in a liquid to form a suspension or in a monomer- or polymer-containing solvent to form a nanocomposite precursor suspension. The process may include a step of converting the suspension to a mat or paper, or converting the nanocomposite precursor suspension to a nanocomposite solid. If the platelets in a suspension comprise graphite oxide platelets, the process may further include a step of partially or totally reducing the graphite oxide after the formation of the suspension.

Alternatively, the resulting platelets may be mixed with a monomer to form a mixture, which can be polymerized to obtain a nanocomposite solid. The platelets can be mixed with a polymer melt to form a mixture that is subsequently solidified to become a nanocomposite solid.

Example 1

Nano-Scaled Graphene Platelets (NGPs) from Graphite Flakes

One hundred grams of natural graphite flakes ground to an average size of approximately 2.3 µm were sealed in a helium gas-filled steel container (the intercalation chamber schematically shown in FIG. 2) at 150° C. and 16 atm for 20 minutes to yield the desired gas-intercalated graphite (GIG). Subsequently, the exit valve was opened to expel the GIG out of the chamber. The GIG was exfoliated to a good extent with an expansion ratio (exfoliated flake thickness/GIG flake thickness) of approximately 12/1 to 26/1. The thickness of individual platelets was found to range from single graphene sheet to approximately 20 graphene sheets. A small portion of the exfoliated graphite particles were then ball-milled in a high-energy plenary ball mill machine for 24 hours to produce nano-scaled particles with reduced length and width (now 0.5-2 µm).

Example 2

NGPs from Short Carbon Fibers

The procedure was similar to that used in Example 1, but the starting material was carbon fibers chopped into segments with 0.2 mm or smaller in length prior to the gas intercalation treatment. The diameter of carbon fibers was approximately 12 µm. An exfoliation ratio of 6/1-8/1 was observed after being discharged from the exit nozzle.

Example 3

NGPs from Graphitic Nano-Fibers (GNFs)

A powder sample of graphitic nano-fibers was prepared by introducing an ethylene gas through a quartz tube pre-set at a temperature of approximately 800° C. A small amount of Cu—Ni powder was positioned on a crucible to serve as a catalyst, which promoted the decomposition of the hydrocarbon gas and growth of GNFs. Approximately 2.5 grams of GNFs (diameter of 10 to 80 nm) were intercalated with a mixture of hydrogen and helium gases at approximately 12 atm and 150° C. for 30 minutes and then to 200° C. at 10 atm for additional 10 minutes. After discharge from the chamber, the intercalated particles were found to be exfoliated to a great extent (without an expansion ratio measurement). A large number of single- or double-layer graphene discs of 10-80 nm in diameter and 0.34 or 0.68 nm in thickness were obtained.

Example 4

Synthesis of Molybdenum Diselenide Nanostructured Materials

The same sequence of steps was utilized to form nano platelets from other layered compounds: gas intercalation and exfoliation, followed by milling, attrition, or sonication. For instance, $MoSe_2$ consisting of Se—Mo—Se layers held together by weak van der Waals forces can be exfoliated via the presently invented process. Dichalcogenides, such as $MoS_2$, have found applications as electrodes in lithium ion batteries and as hydro-desulfurization catalysts. Intercalation was achieved by placing $MoSe_2$ powder in a sealed chamber with pressurized oxygen gas, allowing oxygen to intercalate into the van der Waals gap between Se—Mo—Se sheets at 250° C. and 8 atm for less than 10 minutes. After discharge from the exit nozzle, the resulting $MoSe_2$ platelets were found to have a thickness in the range of approximately 1.4 nm to 13.5 nm with most of the platelets being mono-layers or double layers.

Other single-layer platelets of the form $MX_2$ (transition metal dichalcogenide), including $MoS_2$, $TaS_2$, and $WS_2$, were similarly intercalated and exfoliated, with the intercalation pressure varied between 6 and 8 atm. Again, most of the platelets were mono-layers or double layers. This observation clearly demonstrates the versatility of the presently invented process in terms of producing relatively uniform-thickness platelets.

Example 5

Graphite Oxide Nano Platelets and their Nanocomposites

Graphite oxide was prepared by oxidation of graphite flakes with $KM_nO_4/H_2SO_4$ followed by a chemical removal step according to the method of Lerf, et al. [J. Phys. Chem., B 102 (1998) 4477-4482]. The interlayer spacing of the resulting laminar graphite oxide was determined by the Debey-Scherrer X-ray technique to be approximately 0.73 nm (7.3 Å), which was found to be conducive to the intercalation by larger gas species such as oxygen and nitrogen molecules.

Selected samples of graphite oxide (particle sizes of approximately 4.2 µm) were sealed in an oxygen-filled chamber at a pressure of approximately 8 atm and 200° C. for 30 minutes. The chamber was then isolated from the gas-supplying cylinder with the exit valve being opened to propel the material out of the intercalation chamber. Well exfoliated and separated graphite oxide nano platelets were obtained.

When mixed with water and subjected to a mild ultrasonic treatment after mixing, these nano platelets were well-dispersed in water, forming a stable water dispersion (suspension). Upon removal of water, the nano platelets settled to form an ultra-thin nano-carbon film. Depending upon the volume fraction of nano platelets, the film could be as thin as one to ten graphite oxide layers (approximately 0.73 nm to 7.3 nm).

A small amount of water-soluble polymer (e.g., poly vinyl alcohol) was added to the nano platelet-water suspension with the polymer dissolved in water. The resulting nano platelet suspension with polymer-water solution as the dispersing medium was also very stable. Upon removal of water, polymer was precipitated out to form a thin coating on nano platelets. The resulting structure is a graphite oxide reinforced polymer nanocomposite.

A small amount of the nano platelet-water suspension was reduced with hydrazine hydrate at 100° C. for 24 hours. As the reduction process progressed, the brown-colored suspension of graphite oxides turned black, which appeared to become essentially graphite nano platelets or NGPs.

Example 6

Clay Nano Platelets and Composites

Bentolite-L, hydrated aluminum silicate (bentonite clay) was obtained from Southern Clay Products. Bentolite clay (5 g) was subjected to intercalation by argon gas at 8 atm and 150° C. for 30 minutes. Exfoliation was achieved by rapidly discharging the intercalated material from the interaction chamber into a chamber with an open air environment at room temperature. The resulting clay nano platelets have a thickness in the range of approximately 1 to 25 nm.

Subsequently, melt mixing was used to prepare nanocomposite samples. The amounts of clay and epoxy were 0.1 g, and 0.9 g, respectively. The mixture was manually stirred for 30 min. When stirring, the sample was actually sheared or "kneaded" with a spatula or a pestle. A well dispersed clay nano platelet-based composite was obtained.

The invention claimed is:

1. A process for exfoliating a layered material to produce nano-scaled platelets having a thickness smaller than 100 nm, said process comprising:
   a) charging a layered material, excluding pre-intercalated graphite, to an intercalation chamber comprising a gas at a first temperature which is lower than 200° C. and a first pressure sufficient to cause gas species to penetrate into an interstitial space between layers of the layered material, forming a gas-intercalated layered material, wherein said gas is selected from hydrogen, helium, neon, argon, nitrogen, oxygen, fluorine, carbon dioxide, water vapor, or a combination thereof; and
   b) operating a discharge means to rapidly eject said gas-intercalated layered material through a nozzle into an exfoliation zone at a second pressure and a second temperature, which is lower than 200° C. allowing gas species residing in the interstitial space to exfoliate said layered material to produce the platelets.

2. The process of claim 1 wherein said gas comprises a gas at a supercritical fluid state.

3. The process of claim 1 further including a step of air milling, ball milling, mechanical attrition, and/or sonification to further separate said platelets and/or reduce a size of said platelets.

4. The process of claim 1 further comprising a step of re-compressing said platelets into a sheet-like structure.

5. The process of claim 1 wherein said step of ejecting comprising forcing gas species in said intercalation chamber to flow through a tapered structure from a larger cross-section zone to said nozzle with a smaller cross-section to eject all of said intercalated layered material.

6. The process of claim 1 wherein said first temperature and said first pressure are sufficiently high for said gaseous environment to propel said gas-intercalated layered material out of said intercalation zone.

7. The process of claim 1 wherein said step of charging a layered material is preceded by a step of pre-pressurizing said layered material in a pre-pressurization chamber.

8. The process of claim 7 wherein said pre-pressurization chamber is at a temperature lower than said first temperature.

9. The process of claim 1 wherein said layered material comprises particles with a dimension smaller than 1 μm.

10. The process of claim 1 wherein said platelets have a thickness smaller than 10 nm.

11. The process of claim 1 wherein said platelets have a thickness smaller than 1 nm.

12. The process of claim 1 wherein said platelets comprise single graphene sheets having a thickness of approximately 0.34 nm.

13. The process of claim 1 wherein said second pressure is lower than said first pressure and said second temperature is lower than said first temperature.

14. The process of claim 1 wherein said layered material comprises graphite, graphite oxide, graphite fluoride, graphite or carbon fiber, graphite nano-fiber, or a combination thereof.

15. The process of claim 1 wherein said layered material comprises a layered inorganic compound selected from (a) clay; (b) bismuth selenides or tellurides; (c) transition metal dichalcogenides; (d) sulfides, selenides, or tellurides of niobium, molybdenum, hafnium, tantalum, tungsten or rhenium; (e) layered transition metal oxides; or a combination thereof.

16. The process of claim 1 wherein said layered material reacts with said gas.

17. The process of claim 1 further including a step of dispersing said platelets in a liquid to form a suspension or in a monomer- or polymer-containing solvent to form a nanocomposite precursor suspension.

18. The process of claim 17 further including a step of converting said suspension to a mat or paper, or converting said nanocomposite precursor suspension to a nanocomposite solid.

19. The process of claim 1 further including steps of mixing said platelets with a monomer or polymer to form a mixture and converting said mixture to obtain a nanocomposite solid.

20. The process of claim 1 wherein said layered material is placed in said intercalation chamber and said gas is produced by vaporizing a liquid inside said intercalation chamber or from a different chamber.

* * * * *